INVENTOR.
PALMER FULTZ
BY
Schmieding & Fultz
ATTORNEYS

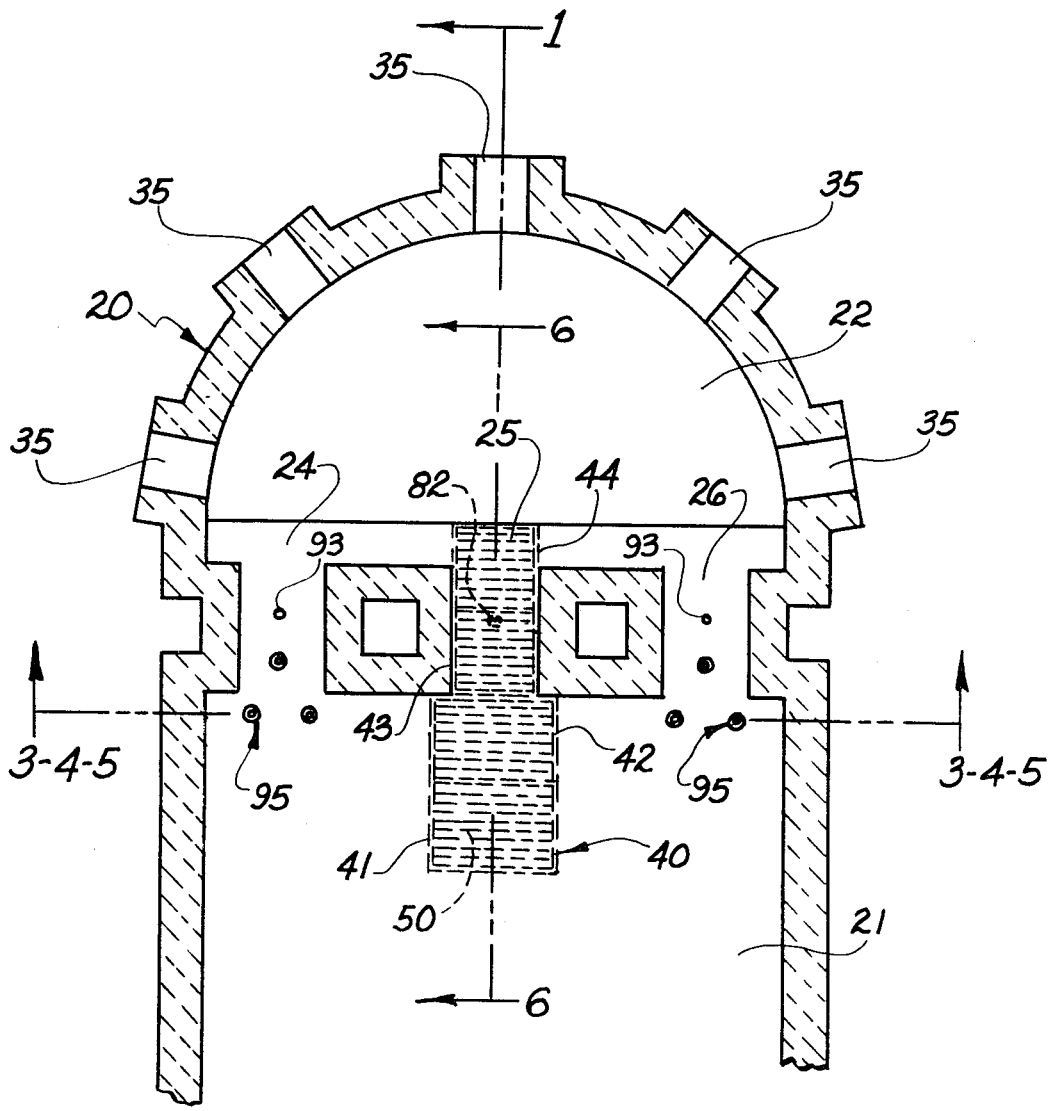
Fig. 2.

July 11, 1972 P. FULTZ 3,676,099
GLASS MELTING FURNACE AND CONTROL MEANS FOR THE FLOW
OF MOLTEN SILICATES THEREIN
Filed Feb. 17, 1970 7 Sheets-Sheet 6

INVENTOR.
PALMER FULTZ
BY
Schmieding & Fultz
ATTORNEYS

INVENTOR.
PALMER FULTZ
BY
Schmieding & Fultz
ATTORNEYS

United States Patent Office 3,676,099
Patented July 11, 1972

3,676,099
GLASS MELTING FURNACE AND CONTROL MEANS FOR THE FLOW OF MOLTEN SILICATES THEREIN
Palmer Fultz, 4280 Hayden Run Road,
Columbus, Ohio 43221
Filed Feb. 17, 1970, Ser. No. 12,107
Int. Cl. C03b 5/22
U.S. Cl. 65—162                                21 Claims

ABSTRACT OF THE DISCLOSURE

A throat-type glass melting furnace provided with variable radiation control means for controlling the flow of molten silicates therein. The control means is characterized by a variable radiation retarding means underlying a radiation area of the furnace bottom along the path of flow of molten silicates through the furnace throat so as to controllably and efficiently dissipate heat from the molten silicates at a specific location and in a controlled manner.

---

This invention relates generally to improvements in the control of furnaces for producing molten silicates of the type that are adapted for the continuous melting of raw materials and for the continuous withdrawal of molten glass.

More particularly, such furnaces include a melting basin and a working basin separated by a bridge wall, said basins being connected by one or more subsurface passages commonly called "throats."

Raw materials are continuously delivered to said melting basin and fuel firing above such basin effects high temperature melting of the raw materials with the partial removal of small bubbles or "seed" before the molten glass passes through the throat or throats and into the working basin.

The function of the working basin, being subjected to less heating as compared to the melting basin, is to allow the glass to cool to the temperature required for presenting the glass to the forming machines and to distribute the glass to a plurality of withdrawal stations from which it is delivered to the forming machines.

It has long been realized in a general way that the above mentioned throats induced peculiar hydraulic flow patterns that resulted in the premature passage through the throat of glass containing an excessive number of seeds resulting from the melting operations.

An analysis of such throat induced problems has been made and discussed in detail in U.S. Letters Patent No. 3,160,692 to E. W. Paxton which patent relates to the control of the flow through throat-type glass melting furnaces.

Attempts to solve the problems induced by throats have been made by utilizing a plurality of throats instead of one assuming that all throats would remain active and that each would transmit its proportional amount of the total flow from the working basin to the melting basin.

Such assumed performance was not realized and it was found that certain of the plurality of throats uncontrollably developed a high degree of stagnation of flow therethrough whereby substantially all of the glass flow required to supply the production demand of the furnace was passed through a warmer unstagnated throat. Such problem of controlling the relative flows through multiple throat and solutions therefor utilizing electrodes immersed in the molten glass, or radiant burners directed against the sides of the throats, are set forth in the U.S. Letters Patent No. 2,866,838 to E. W. Paxton.

Another type of control means for multiple throat melting furnaces is set forth in U.S. Letters Patent No. 3,457,059 to G. B. Boettner wherein a flow of cooling air is directed over the surface of the glass in the working basin, selectively at the exit of certain of the plurality of throats, for the purpose of creating a damming effect to retard the flow through selected throats of the plurality.

THE PROBLEM OF CONTROLLING MULTIPLE THROATS IN RELATIVELY DEEP MELTING FURNACES

Although some of the above mentioned prior methods have been more or less effective in balancing the flow through multiple throats in furnaces of relatively shallow depth, depths of bath of approximately three feet or less, all of the prior methods have been proved futile for balancing throat flows in modern container furnaces which typically incorporate depths of the bath of from four to five feet or more.

In the instances of such deeper glass furnaces, the testing of installation of multiple throats through the bridge walls has perplexingly revealed that the center throat of the plurality uncontrollably remains considerably hotter, with the flow therethrough greatly more vicous as compared to the temperatures and flow present at the outside throats of the plurality.

For example, in a typical container furnace having a depth of bath of approximately five feet the temperature of the center throat was recorded at 2400° Fahrenheit whereas the temperatures of the right and left throats were recorded at 2250° Fahrenheit with such temperatures being determined by temperature responsive elements exposed to the flows at each of the three throats. It has been concluded that little or no flow exists through the outside throats under these conditions due to the very substantial viscosity differential for the molten glass between said two temperatures.

THE MASS AREA VARIABLE RADIATION RELEASE PRINCIPLE

In solving the above described problem of controlling the throat flow through relatively deep container furnaces, I have concluded that the persistent and heretofore uncontrollable relatively hot and highly viscous flow through the central throat is caused by a relatively great "thermal inertia" of a large mass of relatively hot molten glass concentrated centrally of the melting basin before and in such center throat.

More specifically, a large mass of relatively hot molten glass exists generally between a central hot zone in the melting basin, which has been referred to as the "spring" in the treatises of Gelhoff, and the central portion of the bridge wall from which the center throat must be continuously fed. Moreover, the mass of such molten glass and its thermal inertia, or relative incapacity to dissipate its heat, is of such great magnitude in the relatively deep container furnaces that any attempt to overcome such thermal inertia by control techniques, such as the application of coolant water passed through submerged conduits or the application of cooling air to the surface of the bath of the throats, has been futile.

In instances where cooling conduits have been immersed, they have proven inherently limited in their capacity to dissipate heat through a small locally chilled zone of the bath immediately surrounding said conduits. Since molten glass is only relatively slightly permeable to the wave lengths of thermal radiation which it emits, the above mentioned large mass of hot glass before the throat can only inefficiently and to a small extent dissipate heat to said localized chilled zone which inherently has only a very small heat transfer area.

In relatively deep furnaces where cooling air has been applied to the surface of the bath of the working basin for the purpose of retarding flow through the hotter center throat, it has been determined that cooling effect achieved at the exit of the throat for the purpose of retarding same has negligible thermal capability and substantially no effect. Here again the surface glass subjected to the cooling air inherently cannot, with any effectiveness, dissipate enough heat from the molten bath to appreciably effect the above mentioned thermal inertia of the large hot mass before the center throat.

In other instances where attempts have been made to apply cooling air to the exterior of the refractory structure of the center throat or by placing water-cooled pipes in the same area, the attempts to retard said throat have again been futile since the available cooling area is subjected to structural limitations, and most important, heat transferability from the said large hot mass before the throat is inherently negligible due to the relative imperviousness of molten glass to the wave length of radiation which it emits.

In accordance with the present invention, however, I have discovered what is termed herein as the "Mass Area Variable Radiation Release Principle" whereby high rates of heat radiation are effected from a relatively large area of the furnace bottom before, under and at the exit of only the central throat of the plurality, such that a relatively large radiation area exposed to a large cold zone of the environment can dissipate sufficient heat to overcome the thermal inertia of the great hot mass of glass existing between the spring and the central portion of the bridge wall. Moreover, I have devised a method and apparatus for controlling the rate of heat dissipation form said radiation area by efficiently insulating only the bottoms of the outside throats, by eliminating the presence of insulation at the radiation control area, and by utilizing an adjustable radiation controlling surface means beneath the path of the inner flow of molten silicates progressing to and through the center throat.

As another aspect of the present invention, in instances where it may be necessary to control the balance of the right and left outside thoats, it has been determined only a relatively small amount of heat application, or heat dissipation, is required to effect "trim," and such outside throats can be supplied with electrodes emersed in the flow at the outside throats and the application of thermal energy applied thereto can be selectively varied and, if desired, automatically controlled to achieve such balance.

As another alternative, the right and left outside throats of the plurality can be, when required, provided with relatively small uninsulated bottom areas each of which can be provided with a respective relatively small adjustable radiation controlling surface means whereby said outside throats can be "trimmed" to equalize their flows by individually adjusting said small radiation controlling surface means.

As another aspect of the present invention, the above mentioned adjustable radiation controlling surface means is formed by a plurality of individual separately adjustable radiation controlling sections with certain of said sections being located before the throat, certain other of said sections being located below the throat, and still other of said sections being located beneath a portion of the working basin at the exit of the thoat. With this arrangement, various portions along the longitudinal path of the dominating central flow to and through the center throat can be selectively subjected to various degrees of heat dissipation as may be determined to be most desirable for various furnace operating conditions.

As still another aspect of the present invention, the above mentioned adjustable radiation controlling surface means is provided with an automatic control means which includes a sensor for detecting variations in the thermal characteristics of the flow through the center throat, or other selected control throat, with said control means being adapted to automatically vary the rate of heat radiation from the previously mentioned radiation control area as may be required to maintain a selected operating temperature for the controlled throat.

As still another aspect of the present invention, the above mentioned adjustable radiation controlling surface means is preferably of modular or unitized construction so as to be readily removable from the furnace structure. Such means comprises a frame which supports a plurality of pivotally mounted radiation retarding surface members provided with actuating means, said frame, surface members and actuating means being removably mounted as a unit with respect to the supporting substructure of the furnace, thereby providing means for maintenance and modification as may be required.

Further objects and advantages of the present invention will be apparent from the following description, reference being had to the accompanying drawings wherein preferred forms of embodiments of the invention are clearly shown.

IN THE DRAWINGS

FIG. 2 is a partial top sectional view of the furnace of FIG. 1 with the section being taken along the line 2—2 of FIG. 1;

FIG. 6 further shows an automatic control system for effecting automatic adjustment of such radiation control means;

Figure 1:
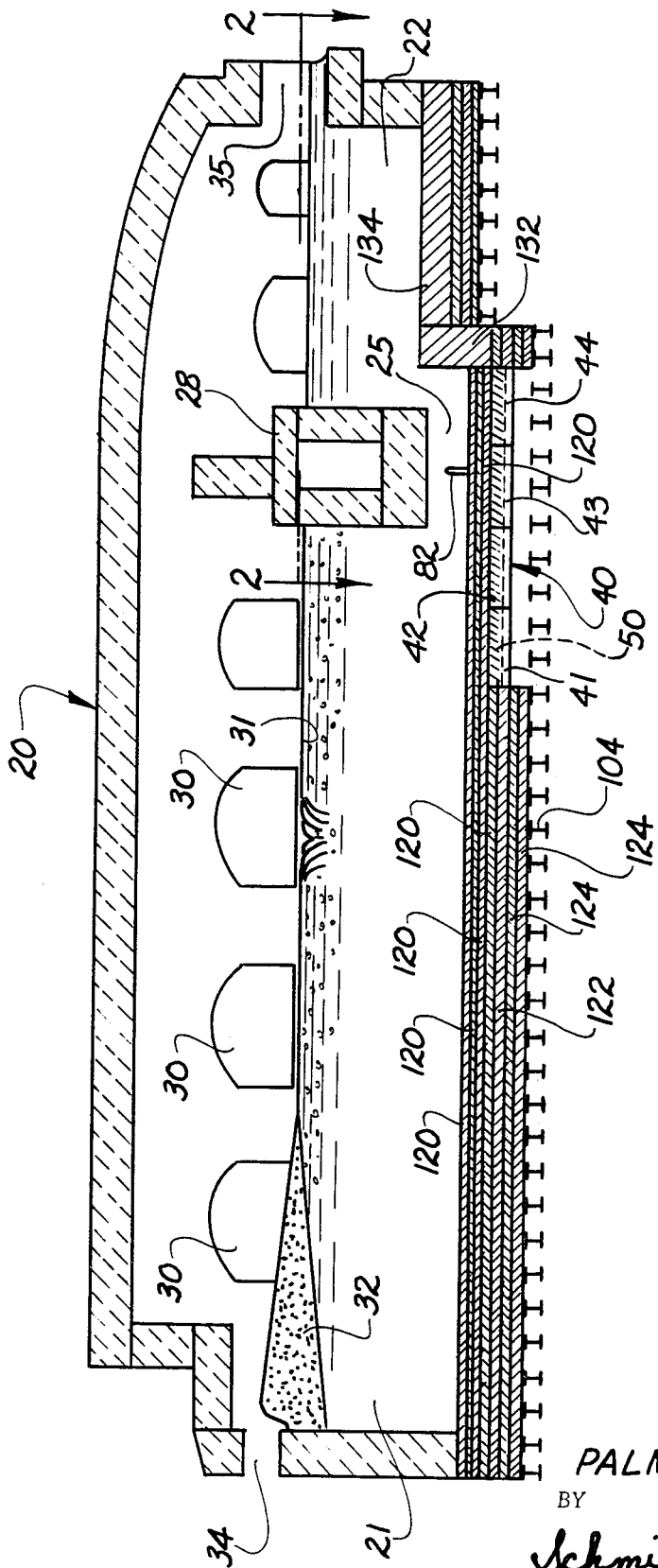
FIG. 1 is a side sectional view of a glass melting furnace constructed in accordance with the present invention. The section is taken along the vertical plane through the longitudinal center line of the furnace.
Figure 3:
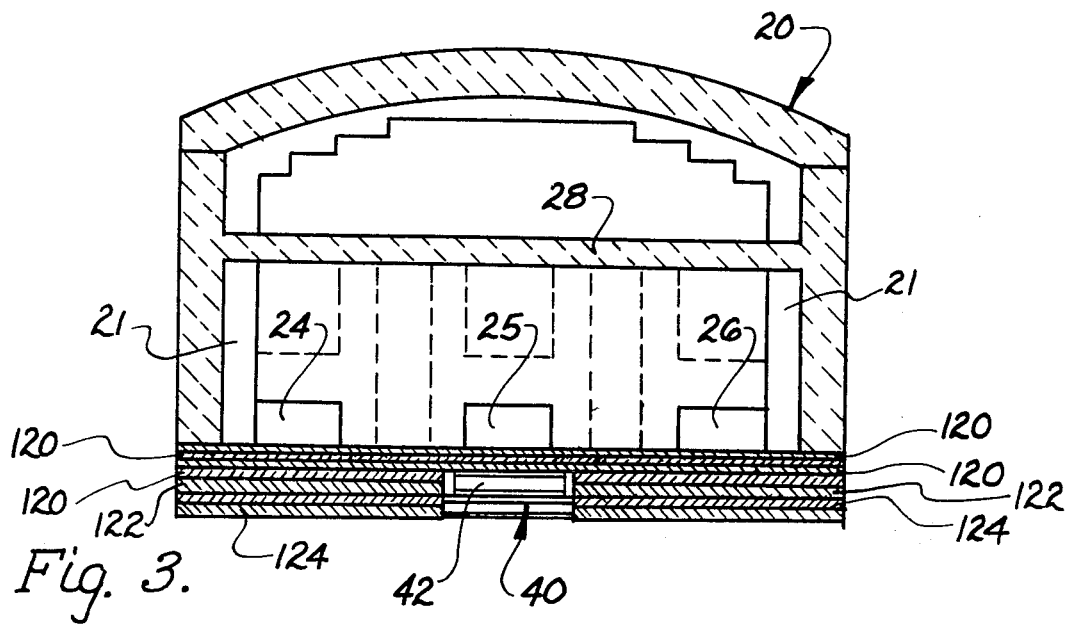
FIG. 3 is an end sectional view of a glass melting furnace constructed in accordance with one embodiment of the present invention with the section being taken along the line 3—3 of FIG. 2.
Figure 5:
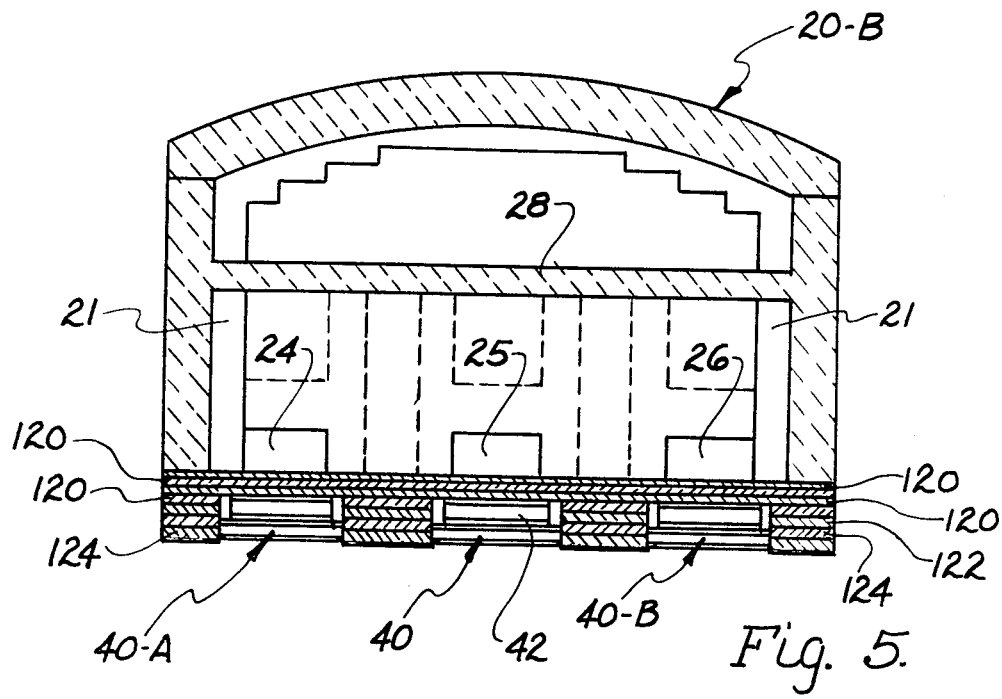
FIG. 5 is an end sectional view of another modified glass melting furnace constructed in accordance with still another embodiment of the present invention with the section being taken along the line 5—5 of FIG. 2.

Referring in detail to the drawings, FIGS. 1 through 3 illustrate a glass melting furnace indicated generally at 20 which includes a melting basin 21 and a working basin 22 connected by a plurality of throats or submerged passages 24, 25 and 26. The throats serve to convey three separate flows of molten silicates through a bridge wall 28 separating the melting basin from the working basin.

The furnace is fired by gas burners introduced by a plurality of ports 30 in each of the longitudinally extending side walls above the service level of the molten glass 31. Raw materials or batch 32 are introduced at end opening 34 by a conventional batch charger, not illustrated, and molten glass is withdrawn at a plurality of feeder channels 35. The continuous withdrawal of glass from the feeder channels 35 produces a differential in static head between the working basin 22 and melting basin 21 which differential causes the glass to flow through throats 24, 25 and 26.

Figure 6:
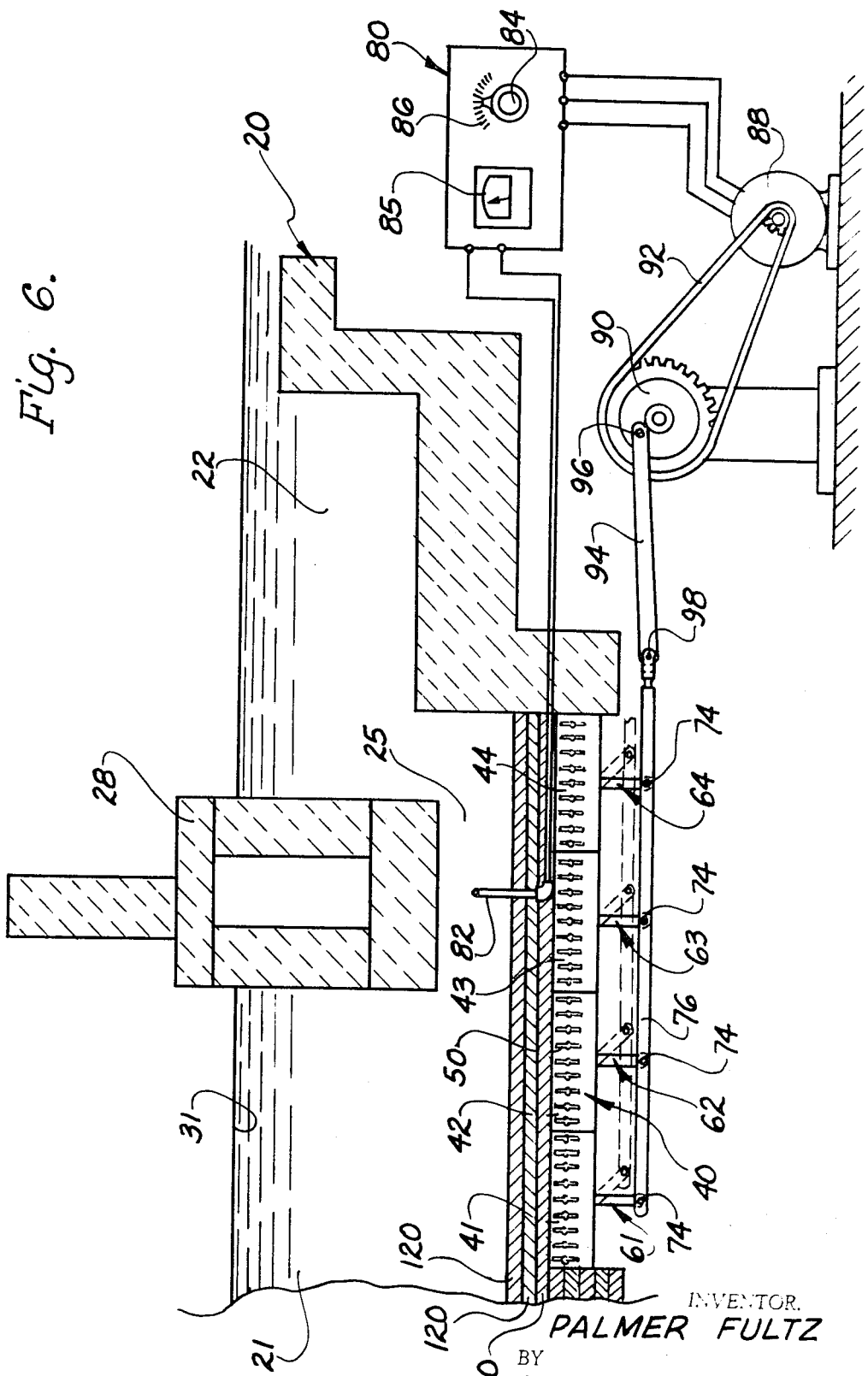
FIG. 6 is a partial side sectional view of a glass melting furnace of the preceding figures illustrating a variable radiation control means comprising a portion thereof, the section being taken along the line 6—6 of FIG. 2.
Figure 7:
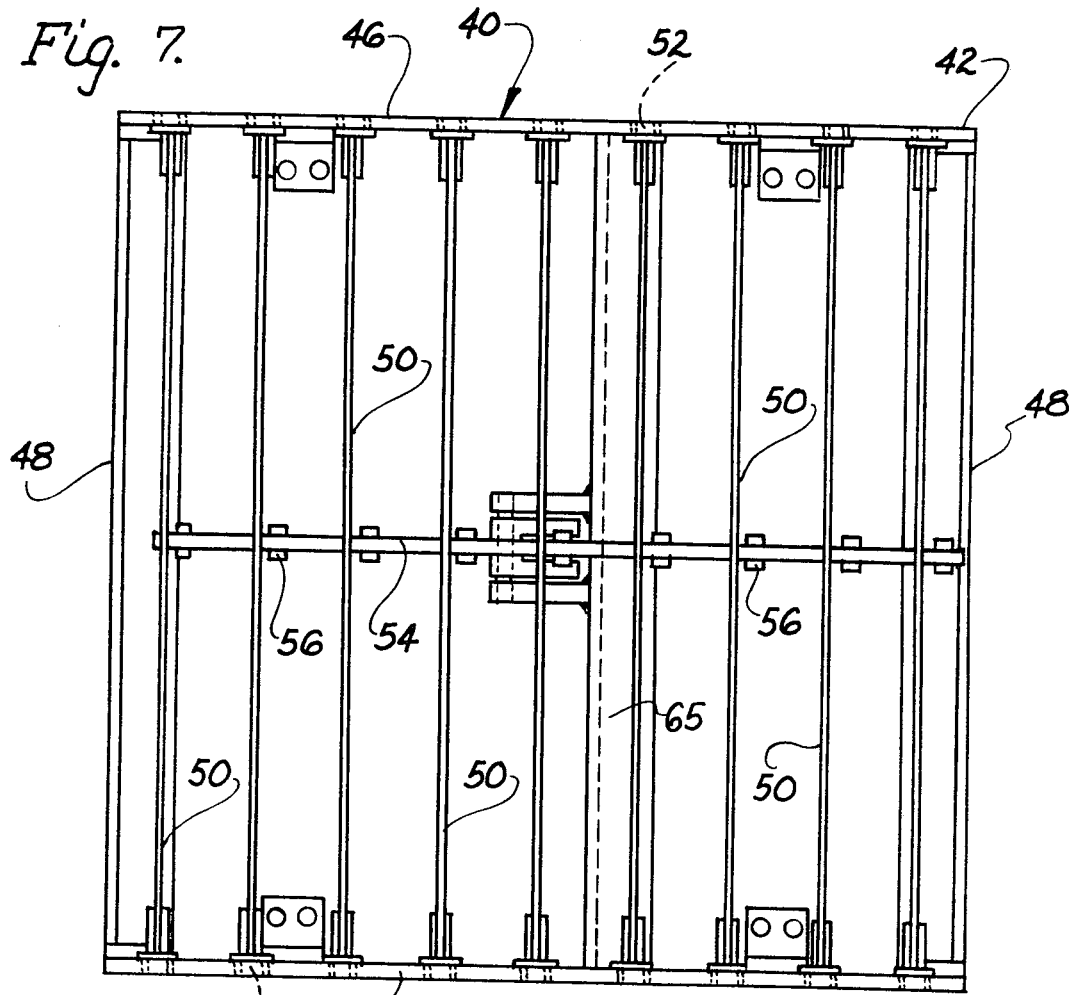
FIGS. 7 and 8 are top and side elevational view of a typical portion of the variable radiation control means of FIG. 6.

Referring particularly to FIGS. 1 through 3, center throat 25 of the melting furnace is provided with a variable radiation controller indicated generally at 40 which consists of a plurality of sections of adjustable radiation retarding elements 50, said sections being indicated at 41, 42, 43 and 44 in the top view of FIG. 2 and the side view of FIG. 6.

The typical construction details of one of the sections 42 is illustrated in detail in FIGS. 7 through 10 and comprises the side frame members 46 and transverse members 48 which essentially comprise the frame of the typical section.

With continued reference to FIGS. 7 through 10, each of the sections 41, 42, 43 and 44 of the variable radiation control means 40 includes a plurality of adjustable radiation controlling surface forming elements 50 which are preferably in the form of polished heat reflective metallic sheets formed of stainless steel or the like, each of which is mounted at both ends to a longitudinal frame member 46 at a pivotal bearing 52. In each of the sections 41–44 the radiation controlling surface elements 50 are all actuated simultaneously by a common bar 54, FIGS. 7 and 8, with each of said elements 50 being connected to said common bar 54 at a respective pivot 56.

Figure 8:
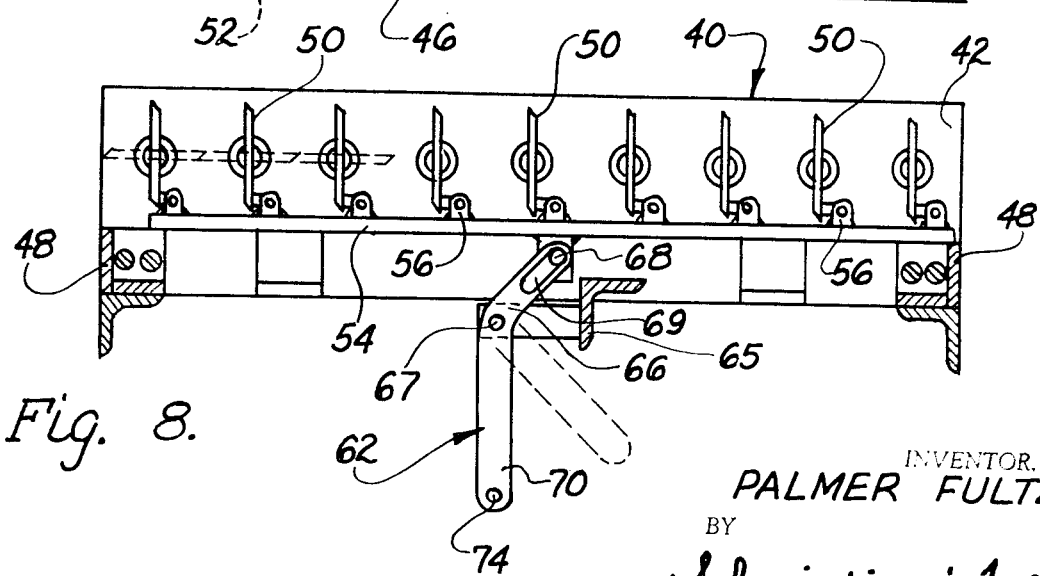

With continued reference to FIGS. 6 through 10, the common bars 54 for the individual sections 41–44 are respectively shifted by respective pivoted levers 61–64 seen in FIG. 6. Each of the levers is mounted on a transverse frame member 65 at a pivot 67 and includes an upper lever arm 66 provided with a slot 69 which engages a pin 68 mounted on common bar 54 such that when a lower lever arm 70 of actuating lever 62 is actuated it shifts its respective common bar 54 to move elements 50 between closed horizontal positions and open vertical position as illustrated in FIG. 8.

It should be mentioned that respective sections 41–44 of radiation control means 40 are respectively provided with actuating levers 61–64 each of which includes a lower pivotal connection 74 which can be connected to a combined actuating rod 76 which, when used, simultaneously adjust all of the plurality of sections 41–44 as is best seen seen in FIG. 6. If any or all of the levers 61–64 are disconnected from actuating rod 76, then each section can be individually adjusted.

With continued reference to FIG. 6, combined actuating rod 76 and all or any of the sections 41–44 can, if desired, be provided with an automatic control apparatus indicated generally at 80 which comprises a sensing means which may be in the form of thermocouple 82 extended into the path of flow through center throat 25 so as to continuously monitor the temperature of the flow of molten silicates therethrough. The automatic control means 80 is further provided with an adjustable knob 84 provided with temperature indicia 86 whereby the operator can set a selected temperature to be maintained at the throat to be controlled. Also, control means 80 can be provided with a temperature read-out meter 85 to show the instantaneous flow temperature existing in the controlled throat.

With continued references to FIG. 6, when automatic control means senses a tendency toward temperature variation in the flow through the throat 25 by means of thermocouple sensing means 82, a motor 88, reversible in its operation, is energized in the appropriate direction to drive a sprocket 90 by a chain 92 so as to either extend or retract a controller arm 94 which is pivotally connected at one end to sprocket 90 at a pivot 96, and at its other end to combined actuating rod 76 at a pivot 98. This serves to adjust the angle of the radiation retarding elements 50 so as to either decrease or increase the effective radiation area from an uninsulated furnace bottom area as may be required to adjust the temperature of the flow of the molten silicates through the throat being monitored as will be indicated when temperature read-out meter 85 coincides with the selected setting of the control adjuster knob 84.

Figure 9:
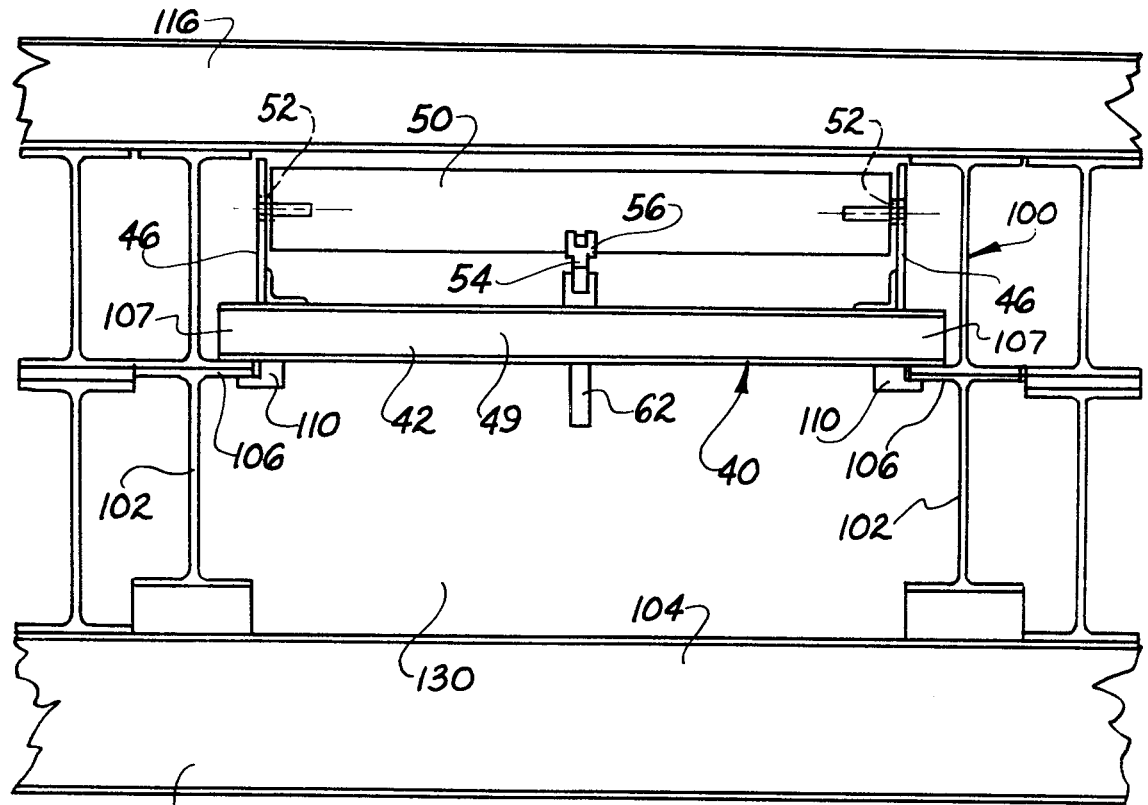
FIG. 9 is a partial end elevational view of a glass melting furnace constructed in accordance with the present invention which illustrates the application thereto of the variable radiation controller of FIGS. 6 through 8.
Figure 10:
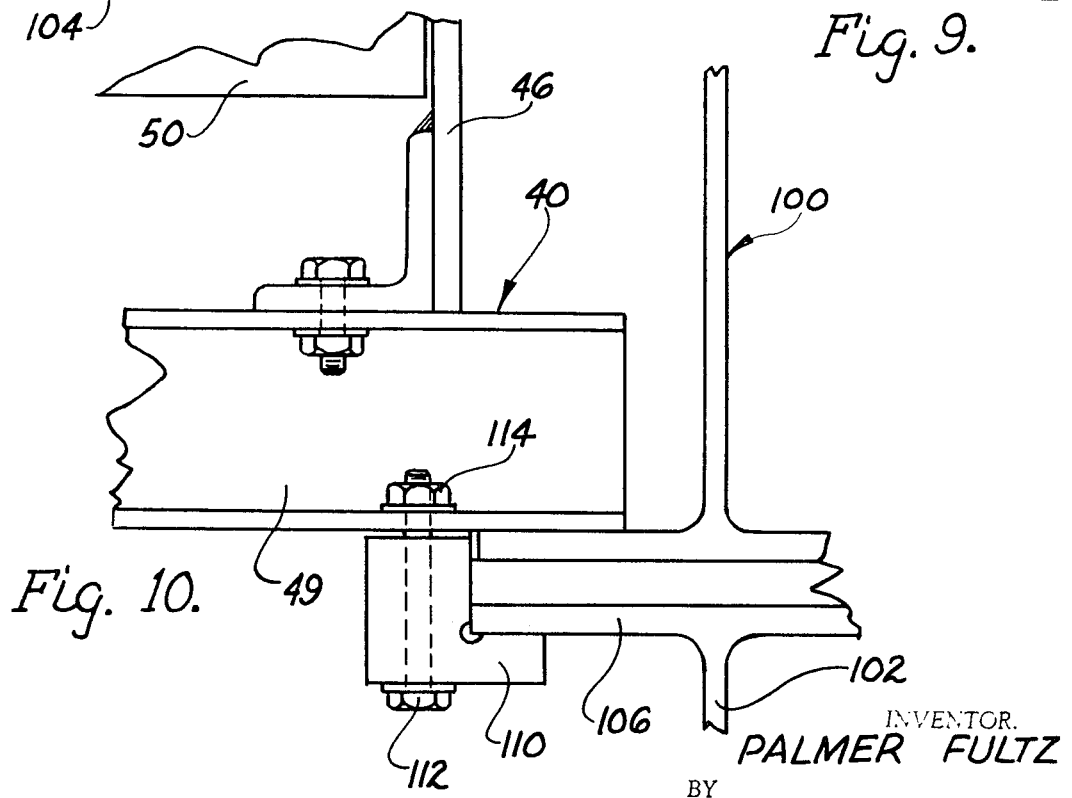
FIG. 10 is a partial enlarged view corresponding to FIG. 9 which illustrates details of the variable radiation control means of FIGS. 6 through 9.

Referring next to FIGS. 9 and 10, the above described radiation control means consisting of the individual sections 41–44 is removably mounted on a frame means sections 41–44 is removably mounted on a frame means 100 including spaced frame members 102 beneath the furnace bottom that are supported on transverse frame members 104 and which, with the environmental space below, define a radiation control zone 130.

Each of the members 102 include inwardly extending flange portions 106 that support the radiation control sections 41–44 and a plurality of clamps 110 are mounted on transverse frame members 49 of the sections and such clamps are tightened into engagement with flanges 106 by bolts 112 and nuts 114.

When it is desired to remove radiation control means 40- or any of the sections thereof, it is merely necessary to loosen mounting clamps 110 and slide the sections longitudinally until ends 107 of transverse frame member 49 are clear of the flanges 106 at which location they can be lowered downwardly and removed.

With reference to FIGS. 1, 3, 4 and 5, the bottom is preferably constructed of multiple layers of refractory material 120 and 122 under which are provided multiple layers of heat insulating material 124. For example, the bottom construction illustrated, except at the radiation area above the variable radiation control means 40, consists of four separate layers of high quality heat resistant refractory, such as zircon or the like, and under this is disposed a layer of clay brick 122. Beneath the clay paving there are two layers 124 of high efficient insulating material.

At the radiation control area of the bottom, however, immediately above radiation control means 40, one of the four layers 120 of heat resistant refractory material as well as the clay layer 122 and insulation layers 124 are omitted so as to decrease heat transfer losses from the bottom to a minimum and thereby achieve the most effective capacity of dissipate heat from the hot mass of glass feeding the center throat.

It should be mentioned that in the embodiment of FIG. 3, where only the center throat 25 is being controlled, one of the layers of refractory and insulation is maintained beneath the outside throats 24 and 26 so as to maintain as high as possible the temperatures of the flows through these normally colder throats.

Figure 4:
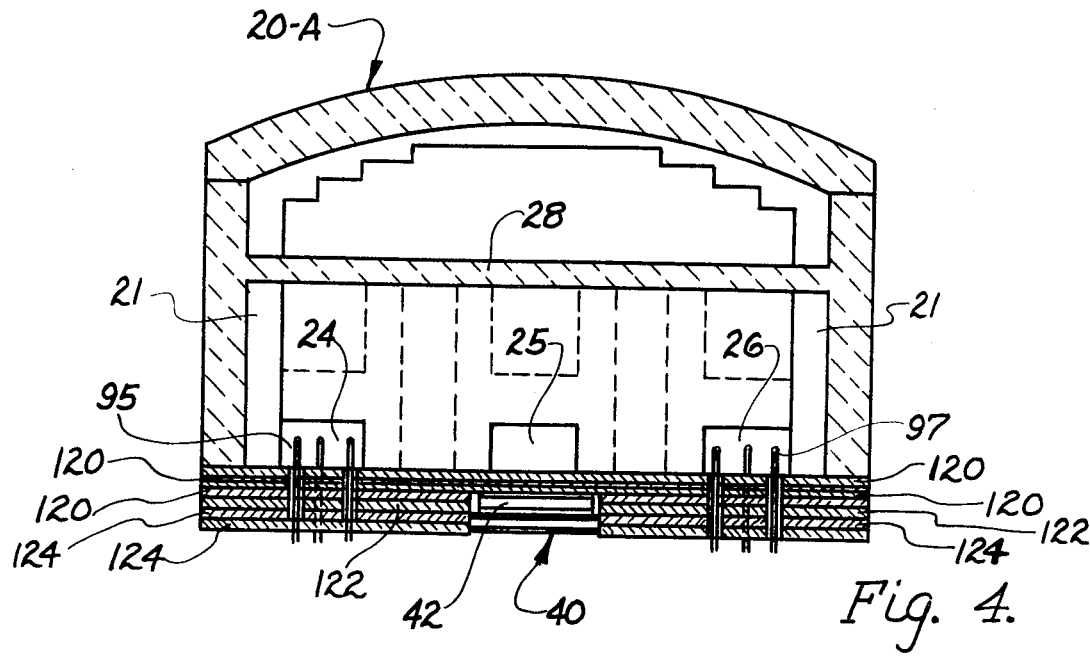
FIG. 4 is an end sectional view of a modified glass melting furnace constructed in accordance with another embodiment of the present invention with the section being taken along the line 4—4 of FIG. 2.

In the embodiment of FIG. 4, the outside throats 24 and 26 are shown provided with means for trimming or balancing the flows therethrough in the form of two groups of electrodes 95 and 97 extended through the furnace bottom and immersed in the flows of molten glass at the outside throats for applying resistance heating thereto. If desired, each of such groups of electrodes can be provided with a sensing means in the form of a thermocouple 93 extended through the furnace bottom and exposed to the flow so as to provide means for determining any thermal unbalance between the flows through the outside thoats 24 and 26 since upon determination of any unbalance, electrical energy can be applied to the colder of the two outside throats so as to heat the flow therein and thereby bring the flows into balance. Also, resistance heating can, if desired, be applied to the flows through both outside throats by energizing both groups of electrodes 95 and 97 so as to augment the flows through such normally colder throats.

I claim:

1. A furnace for producing molten silicates comprising a melting basin; a working basin; a bridge wall separating said basins and including a plurality of submerged throats for delivering a plurality of flows of molten silicates from said melting basin to said working basin, said furnace including a bottom wall heat reflective means; means for varying the radiation from said furnace bottom at certain of said throats; and adjusting means for said radiation heat reflective means for varying the relative temperatures of said flows of molten silicates.

2. The furnace defined in claim 1 that comprises automatic control means for said adjusting means including a sensor for detecting variations in the temperature of certain of said flows of molten silicates.

3. The furnace defined in claim 1 wherein said means for reflecting the radiation comprises a plurality of separately adjustable surface forming members beneath said bottom wall means at longitudinally disposed locations with respect to the path of certain of said flows of molten silicates.

4. The furnace defined in claim 1 wherein said means for reflecting the radiation comprises a plurality of separately adjustable surface forming members beneath said bottom wall means at longitudinally disposed locations with respect to the path of said inner flow of molten silicates, wherein said adjusting means serves to vary the effective radiation retarding area of said surface forming members; and control means for said adjusting means including a sensor for detecting variations in the temperature of certain of said flows of molten silicates.

5. The furnace defined in claim 3 wherein certain of said surface forming members are disposed beneath a portion of the bottom of said melting basin.

6. The furnace defined in claim 3 wherein certain of said surface forming members are disposed beneath the bottom of certain of said throats.

7. The furnace defined in claim 3 wherein certain of said surface forming members are at least partially disposed beneath a portion of the bottom of said working basin.

8. A furnace for producing molten silicates comprising a melting basin; a working basin; a bridge wall separating said basins and including a plurality of spaced submerged throats for delivering a plurality of flows of molten silicates from said melting basin to said working basin, said furnace including a bottom wall means; supporting frame means for said bottom wall means and spaced frame members defining a radiation control zone extending longitudinally of said furnace beneath certain of said submerged throats; radiation controller frame means mounted between said spaced frame members; a plurality of adjustable members mounted on said radiation controller frame means between said bottom wall means and said radiation control zone, said adjustable members forming variable radiation releasing apertures when said members are in an open position; and adjusting means for said adjustable members.

9. The furnace defined in claim 8 that comprises control means for said adjusting means including a sensor for detecting variations in the temperature of certain of said flows of molten silicates.

10. The furnace defined in claim 8 that includes a second plurality of adjustable members mounted on said radiation controller frame means; and a second adjusting means for independently adjusting said second plurality of adjustable members.

11. The furnace defined in claim 8 wherein said adjustable members underlie a portion of the bottom of said melting basin in advance of the entrance to said inner throat.

12. The furnace defined in claim 8 wherein said adjustable members underlie the bottom of said inner throat.

13. The furnace defined in claim 8 wherein adjustable members underlie a portion of the bottom of said working basin at the exit of said inner throat.

14. The furnace defined in claim 8 that includes a first plurality of adjustable members underlying the bottom of said melting basin in advance of the entrance to said inner throat, a second plurality of adjustable members underlying the bottom of said inner throat, and a third plurality of adjustable members underlying the bottom of said working basin at the exit of said inner throat.

15. The furnace defined in claim 14 wherein certain of said pluralities of adjustable members are independently adjustable for varying the relative rates of radiation from their respective bottom portions.

16. The furnace defined in claim 8 wherein said spaced frame members include controller frame mounting portions and wherein said radiation controller frame means is removably supported on said mounting portions.

17. The furnace defined in claim 8 wherein said spaced frame members include longitudinally extending controller frame mounting portions, and wherein said controller frame means includes a plurality of individual controller frames longitudinally aligned in mounted relationship on said controller frame mounting portions.

18. A furnace for producing molten silicates comprising a melting basin; a working basin; a bridge wall separating said basins and including a center throat for a central flow of molten silicates and right and left side throats for right and left flows of molten silicates, said furnace including a refractory bottom, insulation means for said bottom including insulation areas at said right and left throats and a substantially uninsulated heat radiation area at said center throat; and heat reflective means for varying the radiation from a beneath said uninsulated heat radiation area for controlling the rate of heat radiation from the uninsulated heat radiation area beneath said uninsulated heat radiation area of the refractory bottom.

19. The furnace defined in claim 18 wherein said heat reflective means for varying the radiation comprises a plurality of adjustable radiation retarding surface forming members.

20. A furnace for producing molten silicates comprising a melting basin; a working basin; a bridge wall separating said basins and including a plurality of submerged throats for delivering a plurality of flows of molten silicates from said melting basin to said working basin, said furnace including a bottom wall means; and a plurality of movable aperture forming members beneath said bottom wall means at certain of said throats for selectively varying the cross-sectional area of the radiation releasing apertures formed by the members.

21. A furnace for producing molten silicates comprising a melting basin; a working basin; a bridge wall separating said basins and including a center throat for a central flow of molten silicates and right and left side throats for right and left flows of molten silicates, said furnace including a refractory bottom, insulation means for said bottom including insulation areas at said right and left throats and a substantially uninsulated heat radiation area at said center throat; and a plurality of pivoted louvers mounted beneath said uninsulated heat radiation area for varying radiation releasing apertures formed by said louvers when in opened configurations.

References Cited

UNITED STATES PATENTS

| 1,557,148 | 10/1925 | Ferngren | 65—337 X |
| 2,866,838 | 12/1958 | Paxton | 65—162 X |
| 3,248,203 | 4/1966 | Cunningham | 65—337 X |
| 3,457,059 | 7/1969 | Boettner | 65—162 X |
| 3,486,878 | 12/1969 | Greenler | 65—182 |
| 3,503,728 | 3/1970 | Itakura | 65—182 |

FRANK W. MIGA, Primary Examiner

U.S. Cl. X.R.

65—205, 136, 337, 339, 346, 347; 263—50